US010710597B2

(12) United States Patent
Skold et al.

(10) Patent No.: US 10,710,597 B2
(45) Date of Patent: Jul. 14, 2020

(54) METHOD AND SYSTEM FOR COMPUTING A ROAD FRICTION ESTIMATE

(71) Applicant: VOLVO CAR CORPORATION, Gothenburg (SE)

(72) Inventors: Mats Skold, Gothenburg (SE); Mats Jonasson, Partille (SE)

(73) Assignee: VOLVO CAR CORPORATION, Gothenburg (SE)

( * ) Notice: Subject to any disclaimer, the term of this patent is extended or adjusted under 35 U.S.C. 154(b) by 314 days.

(21) Appl. No.: 15/726,968

(22) Filed: Oct. 6, 2017

(65) Prior Publication Data
US 2018/0105181 A1 Apr. 19, 2018

(30) Foreign Application Priority Data

Oct. 13, 2016 (EP) .................................... 16193749

(51) Int. Cl.
*B60W 40/101* (2012.01)
*B60T 8/1755* (2006.01)
*B60W 40/068* (2012.01)
*B60T 8/1764* (2006.01)

(52) U.S. Cl.
CPC ......... *B60W 40/101* (2013.01); *B60T 8/1764* (2013.01); *B60T 8/17551* (2013.01); *B60W 40/068* (2013.01); *B60T 2210/12* (2013.01); *B60T 2210/124* (2013.01); *B60T 2230/02* (2013.01); *B60T 2270/213* (2013.01); *B60W 2520/105* (2013.01); *B60W 2520/125* (2013.01); *B60W 2520/14* (2013.01);
(Continued)

(58) Field of Classification Search
CPC ............... B60T 8/17551; B60T 8/1764; B60T 2270/213; B60W 40/101; B60W 40/068; B60W 2520/30; B60W 2520/28; B60W 2520/105; B60W 2540/18; B60W 2520/14
See application file for complete search history.

(56) References Cited

U.S. PATENT DOCUMENTS

| 8,244,432 | B2 * | 8/2012 | Kogure ............... B60W 40/068 180/197 |
| 9,707,967 | B2 * | 7/2017 | Hartman ............... B60T 8/4872 |

(Continued)

FOREIGN PATENT DOCUMENTS

JP 2011-57036 A 3/2011

OTHER PUBLICATIONS

Extended European Search Report dated May 15, 2017, Applicant No. 16193749.5-1762, Applicant Volvo Car Corporation, 10 Pages.
(Continued)

*Primary Examiner* — Mussa A Shaawat
(74) *Attorney, Agent, or Firm* — Brooks Kushman P.C.

(57) ABSTRACT

A method is described for computing a friction estimate between a road surface and a tire of a vehicle when the vehicle is in motion along a course, the tire being arranged on a steerable wheel of the vehicle, and the vehicle including two front wheels and two rear wheels and an axle rack pivotably attached to a linkage arm connected to the steerable wheel such that a translational motion of the axle rack causes the linkage arm to rotate about a kingpin element such that the linkage arm causes a turning motion of the steerable wheel. A corresponding system and vehicle are also described.

14 Claims, 8 Drawing Sheets

(52) U.S. Cl.
CPC ..... *B60W 2520/28* (2013.01); *B60W 2520/30* (2013.01); *B60W 2540/18* (2013.01)

(56) References Cited

U.S. PATENT DOCUMENTS

| | | | |
|---|---|---|---|
| 2005/0055149 A1* | 3/2005 | Kato | B60T 8/172 701/80 |
| 2006/0086560 A1 | 4/2006 | Furusho et al. | |
| 2008/0262692 A1 | 10/2008 | Kogure et al. | |
| 2008/0294355 A1 | 11/2008 | Berthold et al. | |
| 2010/0114431 A1* | 5/2010 | Switkes | B60T 8/17557 701/41 |
| 2010/0114449 A1* | 5/2010 | Shiozawa | B60L 3/10 701/90 |
| 2011/0015906 A1* | 1/2011 | Bian | B60T 8/172 703/2 |
| 2011/0106458 A1 | 5/2011 | Shiozawa et al. | |
| 2011/0209521 A1* | 9/2011 | Shiozawa | B60L 3/102 73/9 |
| 2012/0024038 A1 | 2/2012 | Von Tardy-Tuch et al. | |
| 2016/0280251 A1 | 9/2016 | George et al. | |
| 2018/0037234 A1* | 2/2018 | Hoedt | B60T 8/172 |

OTHER PUBLICATIONS

Hsu, Yung-Hsiang Judy, "Estimation and Control of Lateral Tire Forces Using Steering Torque," Dissertation, Stanford University, 2009, 188 Pages.

Matilainen, Mika, "Tyre Friction Potential Estimation by Aligning Torque and Lateral Force Information," Master Thesis, Aalto University School of Science and Technology, Nov. 24, 2010, 137 Pages.

Pacejka, Hans B., "Tire and Vehicle Dynamics," 1st Edition, 2002, Butterworth-Heinemann, Elsevier Ltd., Oxford, UK, (See e.g., Chapters 1 and 3), 624 Pages.

* cited by examiner

METHOD AND SYSTEM FOR COMPUTING A ROAD FRICTION ESTIMATE

CROSS-REFERENCE TO RELATED APPLICATIONS

This application claims foreign priority benefits under 35 U.S.C. § 119(a)-(d) to European patent application number EP 16193749.5, filed Oct. 13, 2016, which is incorporated by reference in its entirety.

TECHNICAL FIELD

The present disclosure relates to a method for computing a friction estimate between a road surface and a tire of a vehicle. The present disclosure further relates to a corresponding system and to a vehicle.

BACKGROUND

Active safety is becoming more advanced in today's vehicles as the automotive technology is evolving. For example, most new vehicles are equipped with active safety in the form of the well-known ABS brake system which allows a more controlled braking action for the driver of the vehicle.

In a driving situation with a vehicle, the friction between the road and the tire is of high importance since it stipulates the amount of force that can be transferred from the vehicle to the ground. Thus, the friction is a highly relevant parameter for active safety systems when decisions have to be taken related to for example braking and steering with the vehicle. This is relevant both for manually driven vehicles and for autonomous vehicles.

Friction estimation may generally be done by analyzing a tire force versus the so-called slip angle ($\alpha_{slip}$), see FIGS. 1A-C. The slip angle is the angle between the travel direction $V_x$ of the tire contact patch and the wheel hub direction $W_d$ (i.e., the pointing direction of the wheel). Turning to FIG. 1B which shows the wheel hub direction ($W_{dh}$), the travel direction ($V_x$), an assumed maximum possible parabolic force distribution over the contact area between the tire and the road surface in the lateral direction (y) along x ($\mu_{high}f(x)$), the actual lateral force distribution $F_y(x)$, the resultant lateral force $F_y$, and the corresponding slip angle for a high friction case ($\mu_{high}$), and FIG. 1C which shows the wheel hub direction ($W_{dl}$), the travel direction ($V_x$), an assumed maximum possible parabolic force distribution over the contact area between the tire and the road surface in the lateral direction (y) along x ($\mu_{low}f(x)$), the actual lateral force distribution $F_y(x)$ and the resultant lateral force $F_y$, and the corresponding slip angle for a low friction case ($\mu_{low}$). A comparison between FIGS. 1B-C illustrates that in order to maintain the same resultant lateral tire force $F_y$ magnitude (resulting from the actual lateral force distribution $F_y(x)$ acting on the tire), a larger slip angle is needed for the low friction case (FIG. 1C) compared to the slip angle in the high friction case (FIG. 1B). In other words, when the friction reduces between the tire and the road surface, a larger slip angle is needed to maintain the same lateral tire force $F_y$, i.e., the driver has to turn the vehicle further. The tire force (i.e., resultant force on the tire) may for example be derived from an inertial measurement unit of the vehicle or from the wheel torque. Further details known in the art can be found in "Tire and vehicle dynamics" (Butterworth-Heinemann, Oxford, 2002) by Hans Pacejka.

US2011/0106458 describes to determine the road surface friction on the basis of the slip angle. One drawback of using the slip angle for road friction estimation is that it requires certain amount of wheel excitation, such as acceleration or cornering, consequently, lack of such events reduces the availability of friction estimation.

Accordingly, there is room for improvements in methods for determining road friction estimates.

SUMMARY

In view of above-mentioned prior art, it is an object of the present disclosure to provide an improved method for computing a friction estimate between a road surface and a tire of a vehicle that alleviates at least some of the above-mentioned drawbacks of the prior art.

According to a first embodiment of the disclosure, there is provided a method for computing a friction estimate ($\mu$) between a road surface and a tire of a vehicle when the vehicle is in motion along a course, the tire being arranged on a steerable wheel of the vehicle, and the vehicle comprising two front wheels and two rear wheels and an axle rack pivotably attached to a linkage arm connected to the steerable wheel such that a translational motion of the axle rack causes the linkage arm to rotate about a kingpin element such that the linkage arm causes a turning motion of the steerable wheel, the method comprising the steps of: applying a first drive torque to a first wheel of the two front wheels and the two rear wheels to thereby cause a yaw torque for the first wheel about the kingpin element of the first wheel, applying a second drive torque to at least a second wheel of the two front wheels and the two rear wheels, wherein the relation between the second drive torque and the first drive torque is such that a longitudinal net force on the vehicle caused by any one of the first drive torque or the second drive torque is compensated for by the other one of the first drive torque and the second drive torque, applying a steering force, or a braking torque or a propulsion torque to at least a third wheel of the vehicle such to cause a vehicle yaw torque to at least partly compensate for a vehicle yaw torque caused by the yaw torque for the first wheel such that the vehicle maintains the course, measuring the rack force in the axle rack when the first torque is applied, measuring a steering angle ($\beta$) of the first wheel when the first torque is applied, measuring a vehicle velocity when the first torque is applied, computing the friction estimate based on between the applied first drive torque, the measured rack force, the vehicle velocity, and the steering angle.

A drive torque may be a propulsion torque or a brake torque. A propulsion torque causes an acceleration of the vehicle and the brake torque causes a deceleration (retardation) of the vehicle. A yaw torque provides a turning motion about a center point, for example, a turning motion for a wheel about the kingpin element or a turning motion for the vehicle about a center of the vehicle.

The longitudinal net force is such that it may, in the absence of any other forces cause a translational driving motion for the vehicle. However, the first drive torque and the second drive torque are such that they cancel each other and the translational driving motion is substantially absent (e.g., cancelled). Similarly, applying a steering force, or a braking torque or a propulsion torque to at least a third wheel of the vehicle cancels any vehicle yaw torque caused from a yaw torque from the first wheel such that the vehicle maintains the present driving course. A steering force is applied to turn the wheels of the vehicle such that the vehicle turns. Thus, the steering force causes a yaw torque for the vehicle.

The present disclosure is based on the realization that the availability of friction estimations is increased by being able to calculate the friction in a way that does not affect the course or speed of the vehicle. It has been realized that the rack force may be measured for an applied torque on a single wheel of the vehicle and that the rack force may be related to the friction between the tire and road surface. Further, by applying corresponding torques to other wheels of the vehicle, the net acceleration (or deceleration) and turning yaw of the vehicle may be compensated for. Thereby, the friction estimate may be determined without excessive excitation such as acceleration or cornering, which thereby increases the availability of the friction estimation. The present disclosure is further based on the realization that a wheel subject to propulsion or braking is affected by lateral forces of different magnitude depending on the friction between the road surface and the tire of the wheel.

Accordingly, embodiments of the disclosure may compute the friction between the first wheel and the road without any net translational motion and without affecting the driving course of the vehicle. Thereby, the availability of friction estimation is improved. Furthermore, embodiments of the present disclosure may compute "split-$\mu$" friction, i.e., separate friction estimates of the left and right track of the vehicle.

The rack force, the vehicle velocity, and the steering angle are measured substantially simultaneously and during a time duration when the first torque is applied.

According to one embodiment of the disclosure, the first wheel may be one of the two front wheels and the first drive torque is a braking torque, and wherein the second torque is a propulsion torque applied to the rear wheels, wherein the method comprises: applying a steering force to the front wheels of the vehicle such to generate the vehicle yaw torque to compensate for the vehicle yaw torque caused by the yaw torque for the first wheel; measuring the rack force in the axle rack when the first torque is applied; computing the friction estimate based on the applied braking torque, the measured rack force, the vehicle velocity, and the steering angle. This embodiment is advantageous for rear wheel drive vehicles because the propulsion torque is applied to the rear wheels.

The second torque may be equally split and applied to each of the rear wheels. In other words, a first half of the second torque may be applied to one of the rear wheels and the second half may be applied to the other rear wheel.

In a further embodiment, the first wheel is one of the two front wheels and the first drive torque is a propulsion torque, and wherein the second torque is a braking torque applied to the rear wheels, wherein the method comprises: applying a steering force to the front wheels of the vehicle such to generate the vehicle yaw torque to compensate for the vehicle yaw torque caused by the yaw torque for the first wheel; measuring the rack force in the axle rack when the first torque is applied; computing the friction estimate based on the measured rack force, the braking torque applied to the first wheel, the vehicle velocity, and the steering angle. This embodiment is advantageous for front wheel drive vehicles because the propulsion torque is applied to the front wheels.

According to one embodiment of the disclosure, the first wheel may be one of the two front wheels and the first drive torque may be a braking torque, and wherein the second torque is a propulsion torque applied to a non-braking wheel of the front wheels or the rear wheels, wherein the method comprises: applying a braking torque to one of the rear wheels of the vehicle, the rear wheel located on an opposite side of the vehicle from the first wheel with respect to left-right orientation of the vehicle such to generate a vehicle yaw torque to at least partly compensate for a vehicle yaw torque caused by the yaw torque for the first wheel such that the vehicle maintains the course; measuring the rack force in the axle rack when the first torque is applied; computing the friction estimate based on the measured rack force, the braking torque applied to the first wheel, the vehicle velocity, and the steering angle. Propulsion is thus advantageously applied to an isolated wheel of the vehicle which allows for more flexibility in performing the friction calculation. Furthermore, since one wheel is not subjected to any of the applied torques, this wheel may be used to acquire a speed reference which may be useful for complementary friction measurements.

The first wheel onto which a braking torque is applied and the other wheel onto which a braking torque is applied are located diagonally from each other with respect to the vehicle geometry such to avoid generating a turning yaw for the vehicle.

According to a second embodiment of the disclosure, there is provided a system for computing a friction estimate between a road surface and a tire of a vehicle when the vehicle is in motion along a course, the tire being arranged on a steerable wheel of the vehicle, and the vehicle comprising two front wheels and two rear wheels and an axle rack pivotably attached to a linkage arm connected to the steerable wheel such that a translational motion of the axle rack causes the linkage arm to rotate about a kingpin element such that the linkage arm causes a turning motion of the steerable wheel, the system comprising: a force determining unit for measuring a force in the axle rack; a steering unit for applying an steering force to the front wheels of the vehicle such to generate a vehicle yaw torque for turning with the vehicle; a drive torque unit for applying a drive torque to the wheels; an inertial measurement unit (IMU) and a wheel speed sensor for determining a velocity of the vehicle, and, a control unit module configured to: control the drive torque unit to apply a first drive torque to a first wheel of the two front wheels and the two rear wheels, to thereby cause a yaw torque for the first wheel about the kingpin element of the first wheel; control the drive torque unit to apply a second drive torque to at least a second wheel of the two front wheels and the two rear wheels, wherein the relation between the second drive torque and the first drive torque is such that a longitudinal net force on the vehicle caused by any one of the first drive torque or the second drive torque is compensated for by the other one of the first drive torque and the second drive torque; control the drive torque unit or the steering unit to apply an steering force, or a braking torque or a propulsion torque to at least a third wheel of the vehicle such to generate a vehicle yaw torque to at least partly compensate for a vehicle yaw torque caused by the yaw torque for the first wheel such that the vehicle maintains the course; retrieve the rack force in the axle rack when the first torque is applied; acquire a steering angle of the first wheel when the first torque is applied; retrieve vehicle velocity measured when the first torque is applied from the vehicle inertial measurement unit or the wheel speed sensor; compute the friction estimate based on the applied first torque, the measured rack force, the vehicle velocity, and the steering angle, and provide a signal indicative of the friction estimate.

The force determining unit may operate to measure e.g., current in windings of an electrical motor used for assisting steering of the vehicle. For example, the force determining unit may be an electrical powered assisted servo system. Alternatively, the force determining unit is a force sensor arranged to measure the axle rack force.

The system comprises an inertial measurement unit (IMU) for determining a velocity of the vehicle together with a wheel speed sensor. The wheel speed sensor (e.g., a tachometer) is configured to determine the angular velocity of the wheel. From the angular velocity, a translational velocity and/or tangential velocity of the wheel may be determined. The IMU may comprise accelerometers and/or gyroscopes. The IMU may further be used for determining a slip angle of the vehicle wheels for complementary measurements.

In one embodiment, the system further includes a global positioning system (GPS). With a GPS the accuracy of the velocity determination may be improved.

According to embodiments of the disclosure, the control unit module may comprise a first control unit and a second control unit, wherein the first control unit is configured to: control the drive torque unit to apply a first drive torque to a first wheel of the two front wheels and the two rear wheels, to thereby cause a yaw torque for the first wheel about the kingpin element of the first wheel; control the drive torque control unit to apply a second drive torque to at least a second wheel of the two front wheels and the two rear wheels, wherein the relation between the second drive torque and the first drive torque is such that longitudinal net force on the vehicle caused by any one of the first drive torque or the second drive torque is compensated for by the other one of the first drive torque and the second drive torque; control the drive torque unit or the steering unit to apply an steering force, or a braking torque or a propulsion torque to at least a third wheel of the vehicle such to generate a vehicle yaw torque to at least partly compensate for a vehicle yaw torque caused by the yaw torque for the first wheel such that the vehicle maintains the course; and the second control unit is configured to: retrieve the rack force in the axle rack when the first torque is applied; acquire a steering angle of the first wheel when the first torque is applied; compute the friction estimate, and provide a signal indicative of the friction estimate.

Thus, the controlling of torques and forces is performed by the first control unit and the estimation of the friction is performed by the second control unit separate from the first control unit. Thereby the controlling of torques and force may be done independent from the estimation, thus the control units may operate separately from each other. The first and the second control unit may communicate with each other via means known to the skilled person. For example, the first and the second control unit may communicate with each other via communication ports connected with e.g., networks cabling or USB cabling of the control units, the control units may also communicate wirelessly.

According to yet another embodiment, the system may comprise a third control unit configured to request a friction estimate from the first and the second control unit. The third control unit may receive the signal indicative of the friction estimate.

A control unit may include a microprocessor, microcontroller, programmable digital signal processor or another programmable device.

Effects and features of the second embodiment of the disclosure are largely analogous to those described above in connection with the first embodiment of the disclosure.

There is further provided a vehicle comprising the system. The vehicle may for example be an autonomous vehicle.

In summary, the present disclosure relates to a method for computing a friction estimate (μ) between a road surface and a tire of a vehicle when the vehicle is in motion along a course, the tire being arranged on a steerable wheel of the vehicle, and the vehicle comprising two front wheels and two rear wheels and an axle rack pivotably attached to a linkage arm connected to the steerable wheel such that a translational motion of the axle rack causes the linkage arm to rotate about a kingpin element such that the linkage arm causes a turning motion of the steerable wheel. The present disclosure further relates to a corresponding system and vehicle.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other features of the present disclosure will now be described in more detail, with reference to the attached drawings showing example embodiments of the disclosure.

DETAILED DESCRIPTION

Figure 1A:
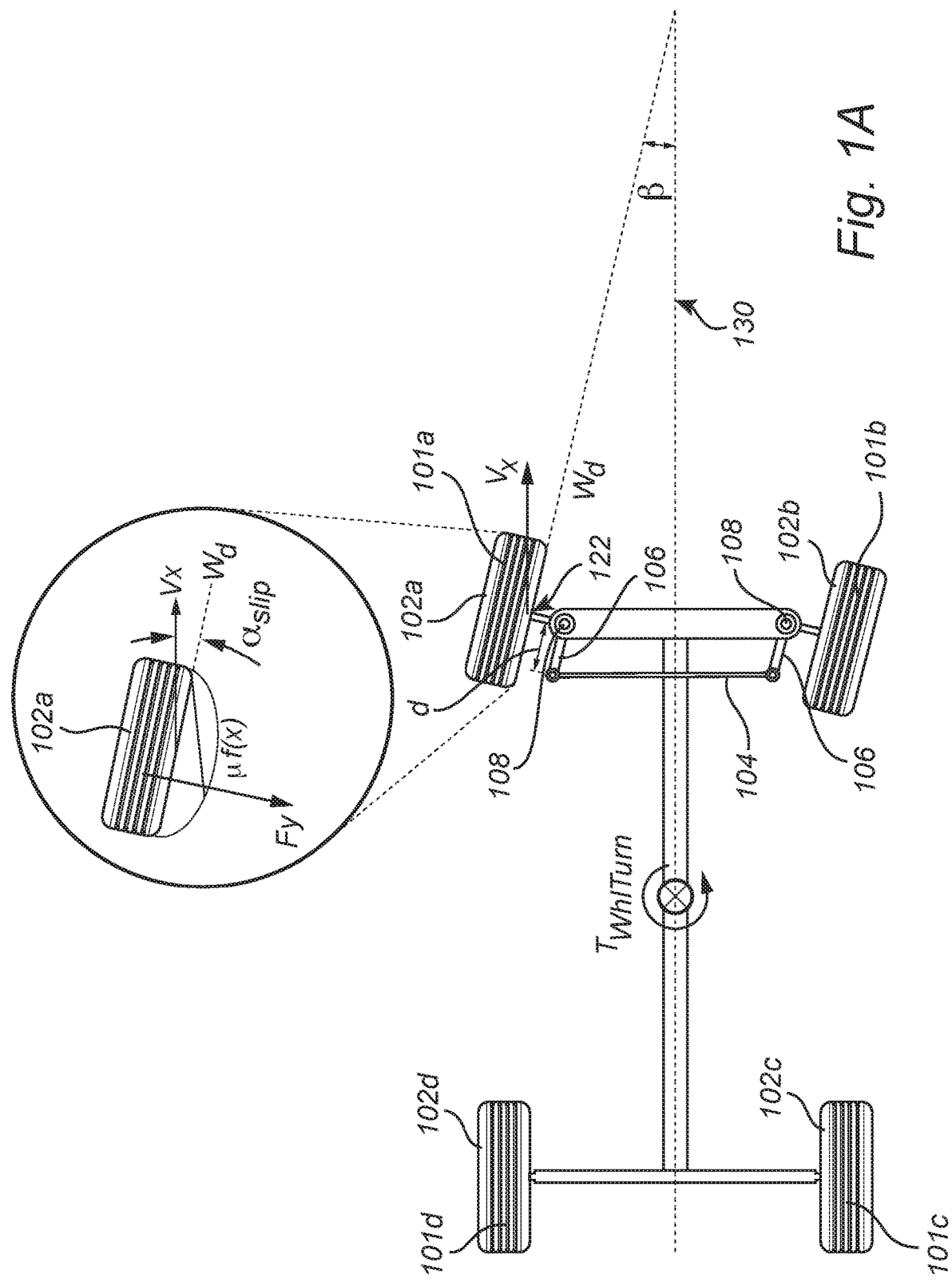
FIGS. 1A-C schematically illustrate parameters related to friction estimation.

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the present detailed description, various embodiments of the system and method according to the present disclosure are mainly described with reference to a vehicle in the form of a car. However, the present disclosure mainly equally be used for other types of vehicles such as trucks, busses, etc. Thus, this disclosure may, be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

Figure 2A:
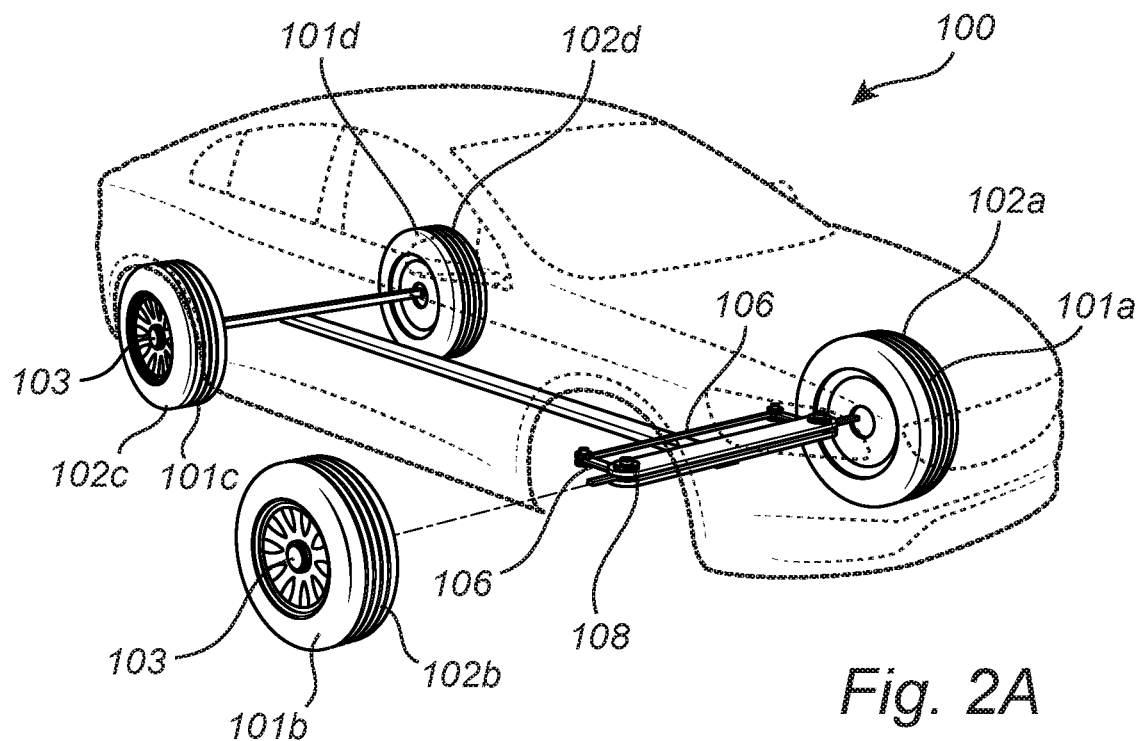
FIG. 2A conceptually illustrates a vehicle according to example embodiments of the disclosure.
Figure 2B:
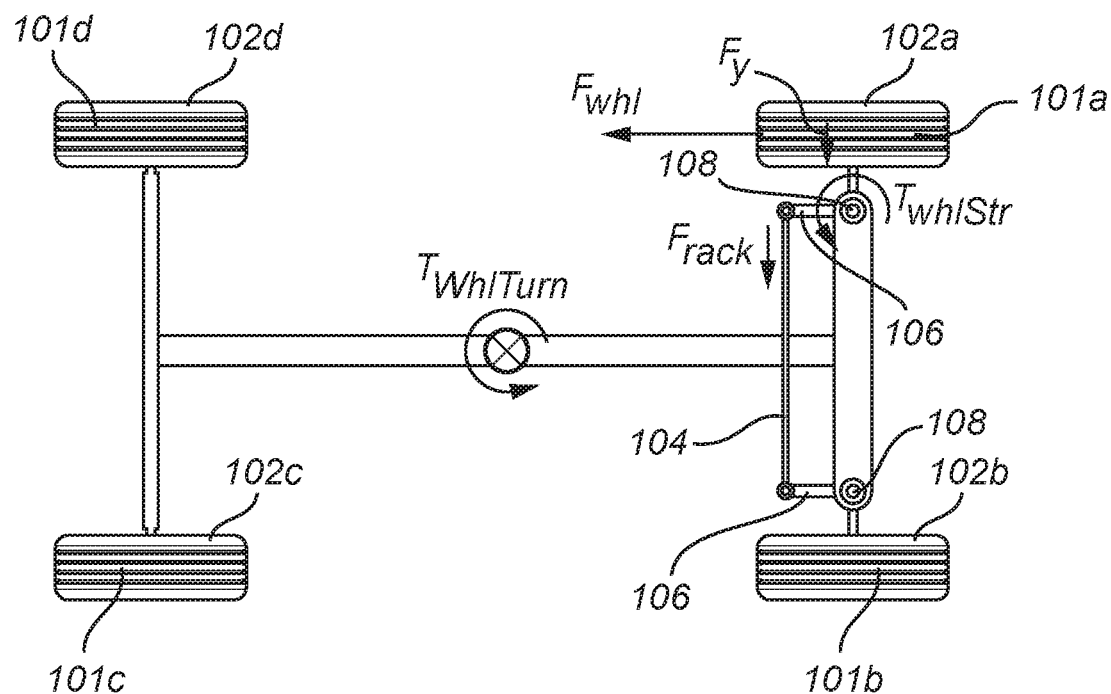
FIG. 2B conceptually illustrates a chassis wheel base with wheels of the vehicle in FIG. 2A.

FIG. 2A illustrates a vehicle 100 according to an embodiment of the disclosure. The vehicle 100 comprises at least one steerable wheel 102a-b. The steerable wheels 102a-b are here shown as the front wheels of the vehicle 100. The vehicle 100 further comprises rear wheels 102c-d. The wheels 102a-d each has a tire 101a-d mounted on a corresponding wheel hub 103 (not all are numbered). Furthermore, and with reference also to FIG. 2B, the vehicle 100 comprises an axle rack 104 pivotably attached to a linkage arm 106 which is connected to a steerable wheel 102a-b such that when the axle rack 104 is subjected to a force which causes a translational motion of the axle rack 104, the linkage arm 106 rotates about a kingpin 108 and thereby causes a turning motion of the wheel 102a-b. In this way, the vehicle is subject to a turning torque ($T_{whlTurn}$). The vehicle 100 may for example be an autonomous car.

Figures 1B, 1C:
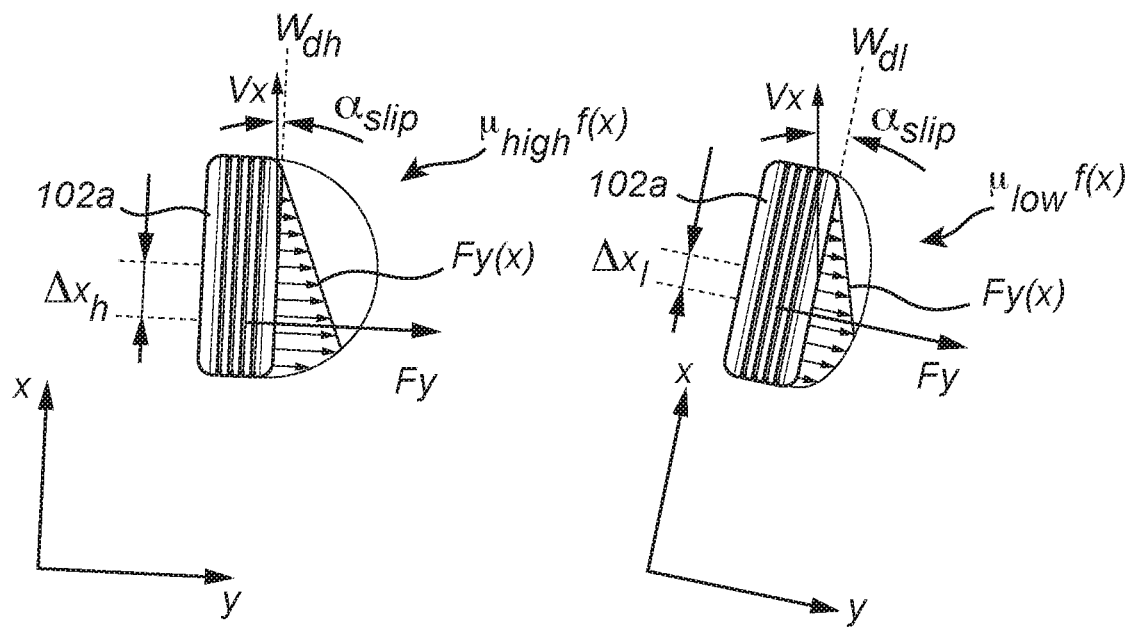

When applying a torque to a single front wheel 102a, the resulting force ($F_{Whl}$) between the tire and the contact area (e.g., the road) generates a torque, $T_{WhlStr}$, that attempts to turn the front wheel 102a around the kingpin 108. The turning torque is in turn transferred to the axle rack 104 and can be monitored as the rack force, $F_{rack}$. In more detail and now with reference to FIGS. 1B-C which illustrates a turning wheel (102a) at different friction conditions. The distance ($\Delta x_h$ and $\Delta x_1$) between the resultant lateral $F_y$ is known as the pneumatic trail. The pneumatic trail ($\Delta x_h$ and $\Delta x_1$) effectively forms a lever for the resultant lateral force $F_y$. Thus, with the pneumatic trail ($\Delta x_h$ and $\Delta x_1$) as the lever the lateral force $F_y$ generates a torque on the wheel 102a, this torque is denoted $T_{WhlStr}$. This torque translates via the linkage arm 106 having a length d, to the axle rack 104 where the axle rack force $F_{rack}$ can be measured. For rotational equilibrium, the axle rack force $F_{rack}$ multiplied with the length d of the linkage arm should equal the torque $T_{WhlStr}$. In a low friction case (FIG. 1C), the assumed parabolic force distribution over the contact area between the tire and the road surface in the lateral direction (y) along x ($\mu_{high}f(x)$) has a lower maximum magnitude illustrated by the parabolic curve being closer to the tire 102a. Thus, in order to obtain the same resultant lateral force $F_y$ the wheel has to turn further (so that the lateral force distribution $F_y(x)$ includes more of the assumed maximum parabolic force distribution $\mu_{low}f(x)$) thereby increasing the slip angle α. This further moves the resultant lateral force $F_y$ closer to the center of the contact patch between the tire and the road, thus the pneumatic trail $\Delta x_1$ is shorter compared to in the high friction case ($\Delta x_h$ in FIG. 1B). Since the length d of the linkage arm 106 is the same in the high friction case and in the low friction case but the pneumatic trail varies, a difference in axle rack force will thereby reflect a difference in friction between the tire and road surface.

Now turning back to FIG. 2B, the wheel force $F_{Whl}$ applied to a single wheel will also generate a torque $T_{WhlTurn}$ around center of gravity trying to turn the vehicle, hence a counter force need to be applied to maintain the desired course. This can for instance be done by applying additional wheel forces or by steering, for example a corresponding wheel force of opposite sign of $F_{Whl}$ may be applied to other wheel(s) to not influence the vehicle acceleration during friction estimation.

A wheel 102a subject to propulsion or braking (in FIG. 2B it is braking) is affected by lateral forces of different magnitude depending on the friction between the road surface and the tire of the wheel. The lateral force is generally a function ($F_y(T_{WhlStr}, \mu, \alpha_{slip})$) of the wheel torque ($T_{WhlStr}$), the coefficient of friction (μ), and the slip angle ($\alpha_{slip}$), see FIGS. 1A-C. The lateral force $F_y$ is measurable via the rack force $F_{rack}$ as described with reference to FIGS. 2A-B and FIGS. 1A-C. Furthermore, the slip angle ($\alpha_{slip}$) generally depends on the velocities of the vehicle (lateral velocity, longitudinal velocity, and yaw velocity) and the steering angle β (see FIG. 1A) of the vehicle. The steering angle is the angle between a longitudinal centerline 130 of the vehicle (between rear and front of the vehicle) and the wheel hub direction $W_d$ (see FIG. 1A). The steering angle may be measured by a steering angle sensor arranged on the steering column (not shown) of the vehicle. The sensor may measure the rotational angle of the steering wheel and thereby derive the steering angle. Another way to measure the steering angle is to determine the position (translational position) of the axle rack and therefrom derive the steering angle. Accordingly, the slip angle can generally be provided as a function (α(velocity, steering angle), e.g., α=α'+β, where α' is proportional to $F_y$) of the steering angle and the velocities. From the two functions $F_y(T_{WhlStr}, \mu, \alpha_{slip})$ and α(velocity, steering angle) the friction μ may be derived. For details regarding the functions ($F_y(T_{WhlStr}, \mu, \alpha_{slip})$ and α(velocity, steering angle) which are generally known in the art) and relationships between the above parameters, see "Tire and vehicle dynamics" (Butterworth-Heinemann, Oxford, 2002) by Hans Pacejka (see in particular Chapter 1 and 3 of the Pacejka reference).

Different embodiments of the disclosure will now be described with reference to FIGS. 3-6.

Figure 3:
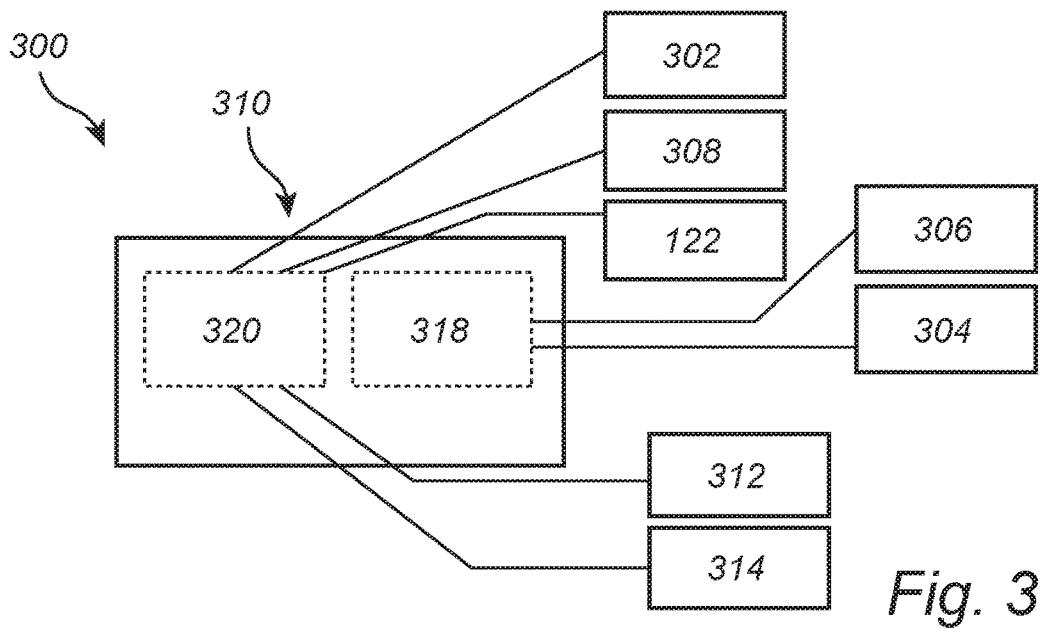
FIG. 3 schematically illustrates a system according to an exemplary embodiment of the disclosure.

FIG. 3 schematically illustrates a system according to an example embodiment of the disclosure. The system 300 comprises a force determining unit which may be embodied as an electrical powered assisted system 302 for a steering arrangement assisting the driver with power for steering of the vehicle (i.e., to apply a force on the axle rack 104), a steering unit 304 for applying a steering force to the front wheels (i.e., to apply a force on the axle rack 104) of the vehicle 100 such to generate a vehicle yaw torque for turning with the vehicle. The steering unit may be embodied as a part of the electrical powered assisted system 302 or as a separate module. The system further comprises a drive torque unit 306 for applying a drive torque to the wheels. The drive torque unit 306 may be an internal combustion engine of the vehicle or a separate electrical motor. The system further comprises an inertial measurement unit (IMU) 308 for determining a velocity of the vehicle together with a wheel speed sensor 314. The wheel speed sensor 314 (e.g., a tachometer 122, see FIG. 1A) is configured to determine the angular velocity of the wheel. The IMU 308 may comprise accelerometers and/or gyroscopes such that at least the velocity of the vehicle in the plane of the contact surface between the vehicle 100 tire and the ground can be determined. The IMU may however determine the velocity in all directions. There is further a control unit module 310 which is configured to control the drive torque unit 306, to control the steering unit, retrieve a rack force from the force determining unit 302 and the vehicle velocity from the IMU 308. The control unit module 310 is further configured to compute the friction estimate based on a relation between the applied first torque, the measured rack force, the vehicle velocity, and the steering angle, and to provide a signal indicative of the friction estimate.

The system 300 may further comprise a global positioning system (GPS) 312. With the GPS 312 the velocity of the vehicle may be determined with improved accuracy.

In one embodiment, the control unit module 310 comprises a first control unit 318 and a second control unit 320 indicated by dashed lined boxes in FIG. 3. The controlling of torques and forces is performed by the first control unit 318 and the estimation of the friction is performed by the second control 320 unit separate from the first control unit. In other words, the first control unit 318 controls the drive torque unit 306 and the steering unit 304, for example such that the vehicle maintains its course during friction estimation. The second control unit 320 is configured to receive the rack force from the force determining unit 302 and the vehicle velocity from the IMU 308 and wheel speed sensor 122, and optionally further velocity information from the GPS.

Figure 4:
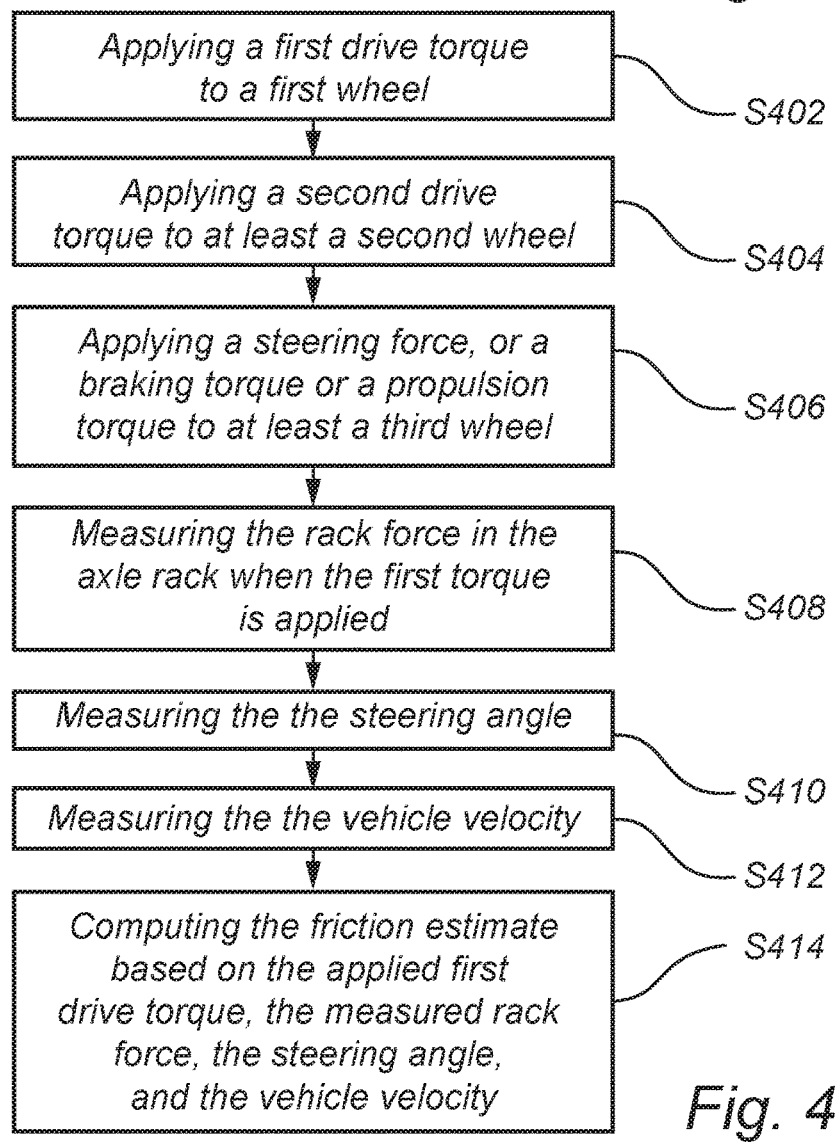
FIG. 4 is a flow-chart of method steps according to an exemplary embodiment of the disclosure.

Turning now to FIG. 4 illustrating a flow-chart of method steps according to an embodiment of the disclosure. The method comprises a first step of S402 applying a first drive (propulsion or brake) torque to a first wheel of the two front wheels 102a-b and the two rear wheels 102c-d to thereby cause a yaw torque for the first wheel about the kingpin element of the first wheel. Subsequently, S404 applying a second drive torque to at least a second wheel of the two front wheels and the two rear wheels, wherein the relation between the second drive torque and the first drive torque is such that a (translational driving motion) longitudinal net force for the vehicle caused by any one of the first drive torque or the second drive torque is compensated for by the other one of the first drive torque and the second drive torque. In a further step S406 applying a steering force, or a braking torque or a propulsion torque to at least a third wheel of the vehicle such to cause a vehicle yaw torque to at least partly compensate for a vehicle yaw torque caused by the yaw torque for the first wheel such that the vehicle maintains the course. In step S408, measuring the rack force in the axle rack when the first torque is applied and in step S410 measuring a steering angle of the first wheel when the first torque is applied. Furthermore, the vehicle velocity when the first torque is applied is measured in step S412. Lastly, S414, computing the friction estimate based on the applied first drive torque, the measured rack force, the vehicle velocity, and the steering angle.

Figure 5A:
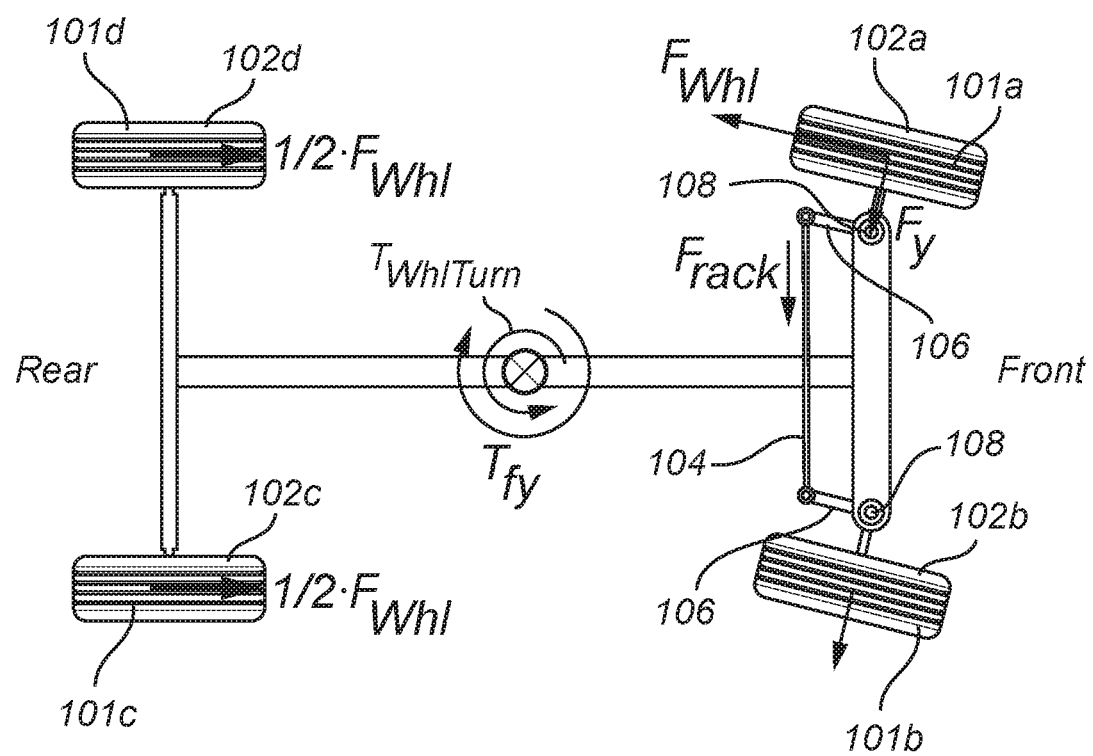
FIG. 5A schematically illustrates forces and torques related to method steps according to an exemplary embodiment of the disclosure.
Figure 5B:
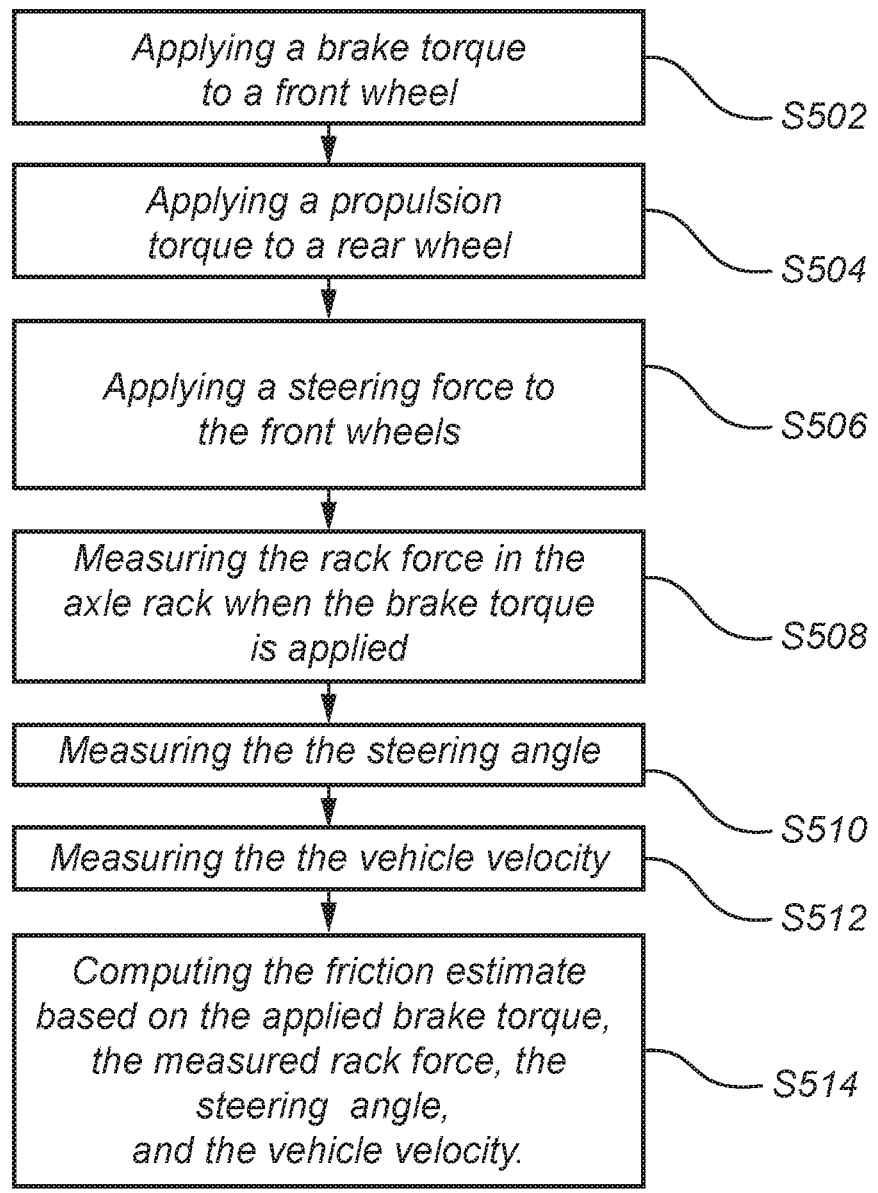
FIG. 5B is a flow-chart of method steps according to the exemplary embodiment of FIG. 5A and is described in conjunction with FIG. 5A.

Turning now to FIGS. 5A-B which illustrate a flow-chart of method steps (FIG. 5B) and corresponding wheel torques, forces on vehicle wheels 102a-d and axle rack (FIG. 5A).

In a first step S502, a braking torque ($F_{Whl}$) is applied to one of the front wheels, in the illustrated example (FIG. 5A) the braking torque is applied to front wheel 102a. A corresponding propulsion torque ($\frac{1}{2} * F_{Whl}$) is applied in step S504 to both rear wheels 102c-d such that the longitudinal net force (i.e., a force in the rear-front direction) is cancelled, thereby no or substantially no translational net motion of the vehicle is caused the combination of the braking torque ($F_{Whl}$) and the propulsion torque. The braking torque ($F_{Whl}$) and the propulsion torque ($\frac{1}{2} * F_{Whl}$) applied to both rear wheels induces a yaw torque ($T_{WhlTurn}$) on the vehicle, in step S506 a steering force is applied to the wheels 102a-b by a yaw torque ($T_{Fy}$). The steering force is applied to counteract the turning torque ($T_{WhlTurn}$) induced by the braking torque ($F_{Whl}$) and the propulsion torques ($\frac{1}{2} * F_{Whl}$). When the brake torque is applied to front wheel 102a, the force in the axle rack 104 (step S508) and the steering angle (S510) is measured. Further, in step S512, the vehicle velocity is measured at the same time as when the rack force is measured in step S508. Lastly S514, the friction estimate is compute based on the applied braking torque, the measured rack force, the vehicle velocity, and the steering angle.

It should be noted that the method steps described with reference to FIGS. 5A-B may be for rear wheel drive vehicles. In the case of front wheel drive vehicles, the brake torque in step S502 is applied to a rear wheel 102c-d and the propulsion torque is applied to a front wheel 102a-b.

Figure 6A:
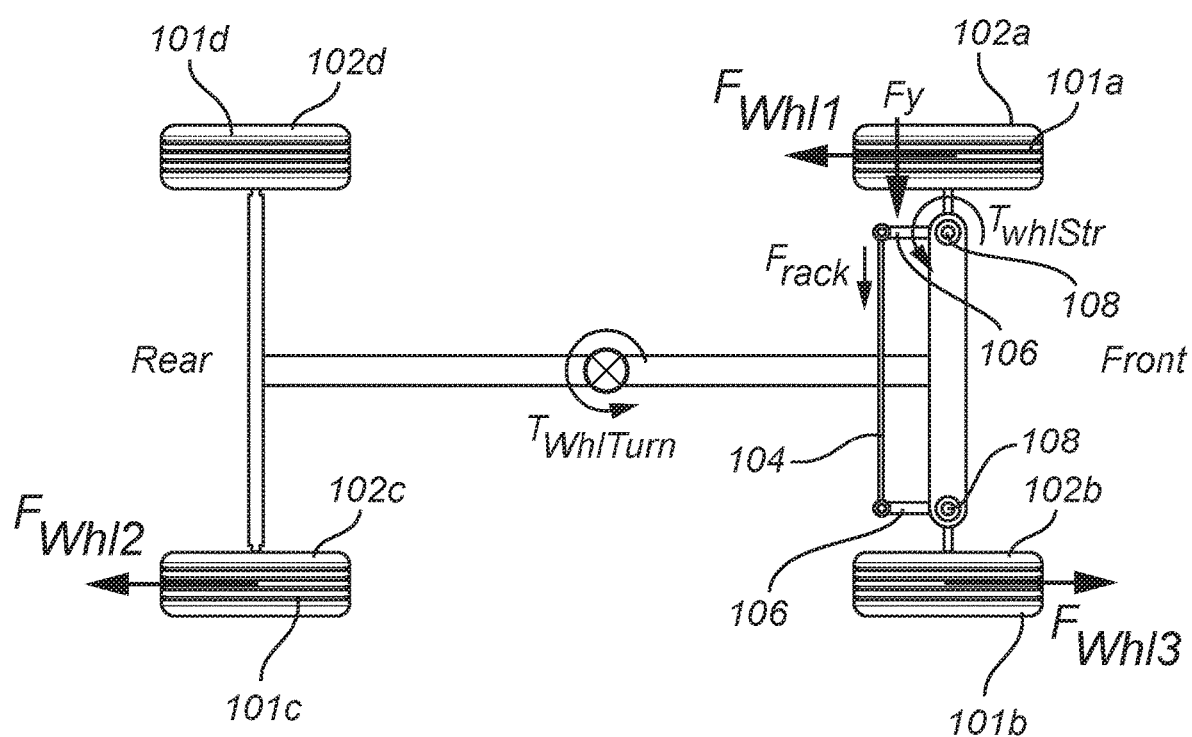
FIG. 6A schematically illustrates forces and torques related to method steps according to an exemplary embodiment of the disclosure.
Figure 6B:
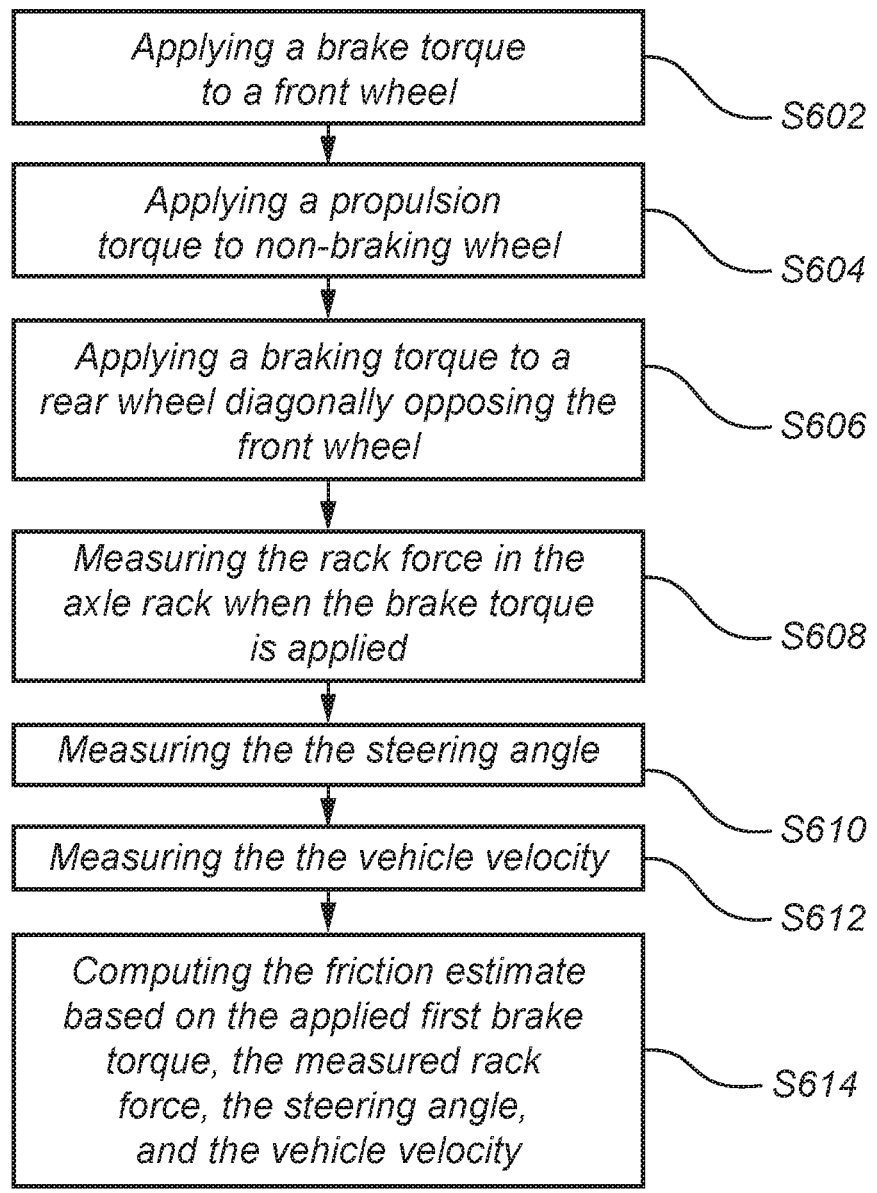
FIG. 6B is a flow-chart of method steps according to the exemplary embodiment of FIG. 6A and is described in conjunction with FIG. 6A.

Turning now to FIGS. 6A-B which illustrate a flow-chart of method steps (FIG. 6B) and corresponding wheel torques, forces on vehicle wheels 102a-d and axle rack (FIG. 6A).

In the first step S602 a braking torque ($F_{Whl1}$) is applied to a front wheel 102a. A corresponding propulsion torque ($F_{Whl3}$) is applied (S604) to a non-braking wheel, in this case front wheel 102b to compensate for the braking of the vehicle caused by the braking torque ($F_{Whl1}$). In addition (S606), a brake torque ($F_{Whl2}$) is applied to the rear wheel 102c arranged diagonally opposing the first wheel 102a in order to avoid generating a turning yaw for the vehicle 100. When the brake torque is applied to front wheel 102a, the force in the axle rack 104 (step S608) and the steering angle (S610) is measured. Further, the vehicle velocity is measured in step S612 at the same time as when the rack force is measured in step S608. Lastly S614, the friction estimate is computed based on the braking torque applied to the front wheel 102a, the measured rack force, the vehicle velocity, and the steering angle.

With the above described methods, the friction estimate can be probed and computed while the vehicle is travelling along a course without substantially affecting the course. Thus, the driver and the passenger of the vehicle may not notice the friction estimate computation including the applied forces and torques. For example, the friction estimation may be performed while cornering or driving along a straight course.

The control unit may include a microprocessor, microcontroller, programmable digital signal processor or another programmable device. It should also be noted that the system 300, force determining unit, electrical powered assisted system 302, steering unit 304, drive torque unit 306, inertial measurement unit 308, control unit module 310, GPS 312, first control unit 318, second control unit 320 as well as any other unit, module, system, device, arrangement or the like described herein may comprise and/or be implemented in or by one or more appropriately programmed processors (e.g., one or more microprocessors including central processing units (CPU)) and associated memory and/or storage, which may include operating system software, application software and/or any other suitable program, code or instructions executable by the processor(s) for controlling operation thereof, for providing and/or controlling interaction and/or cooperation between the various features and/or components described herein, and/or for performing the particular algorithms represented by the various functions and/or operations described herein.

The person skilled in the art realizes that the present disclosure by no means is limited to the embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for computing a friction estimate between a road surface and a tire of a vehicle when the vehicle is in motion along a course, the tire being arranged on a steerable wheel of the vehicle, the steerable wheel being one of multiple wheels of the vehicle, the multiple wheels including two front wheels and two rear wheels, the vehicle further comprising an axle rack pivotably attached to a linkage arm connected to the steerable wheel such that a translational motion of the axle rack causes the linkage arm to rotate about a kingpin element such that the linkage arm causes a turning motion of the steerable wheel, the method comprising:
 applying a first drive torque to a first wheel of the multiple wheels to thereby cause a yaw torque for the first wheel about a kingpin element of the first wheel, wherein the first drive torque is one of a braking torque or a propulsion torque;
 applying a second drive torque to at least a second wheel of the multiple wheels, wherein the second drive torque is the other one of the braking torque or the propulsion torque, and wherein the relation between the second drive torque and the first drive torque is such that a longitudinal net force on the vehicle caused by any one of the first drive torque or the second drive torque is compensated for by the other one of the first drive torque or the second drive torque;
 applying a steering force to the front wheels of the vehicle to generate a second vehicle yaw torque to at least partly compensate for a first vehicle yaw torque caused by the yaw torque for the first wheel such that the vehicle maintains the course;
 measuring a rack force in the axle rack when the first drive torque is applied;
 measuring a steering angle of the first wheel when the first drive torque is applied;
 measuring a vehicle velocity when the first drive torque is applied;
 computing the friction estimate based on the applied first drive torque, the measured rack force, the vehicle velocity, and the steering angle.

2. The method according to claim 1 wherein the first wheel is one of the two front wheels and the first drive torque is the braking torque, and wherein the second torque is the propulsion torque applied to the rear wheels.

3. The method according to claim 2 wherein the second drive torque is equally split and applied to each of the rear wheels.

4. The method according to claim 1 wherein the first wheel is one of the two front wheels and the first drive torque is the propulsion torque, and wherein the second drive torque is the braking torque applied to the rear wheels.

5. The method according to claim 1 wherein the vehicle is in motion along a substantially unaffected course.

6. A system for computing a friction estimate between a road surface and a tire of a vehicle when the vehicle is in motion along a course, the tire for arrangement on a steerable wheel of the vehicle, the steerable wheel being one of multiple wheels of the vehicle, the multiple wheels including two front wheels and two rear wheels, the vehicle further comprising an axle rack pivotably attached to a linkage arm connected to the steerable wheel such that a translational motion of the axle rack causes the linkage arm to rotate about a kingpin element such that the linkage arm causes a turning motion of the steerable wheel, the system comprising:
 a force determining unit for measuring a force in the axle rack;
 steering unit for applying a steering force to the front wheels of the vehicle to generate a vehicle yaw torque for turning with the vehicle;
 a drive torque unit for applying a drive torque to the wheels;
 an inertial measurement unit and a wheel speed sensor for determining a velocity of the vehicle, and,
 a control unit module configured to:
 control the drive torque unit to apply a first drive torque to a first wheel of the multiple wheels, to thereby cause a yaw torque for the first wheel about a kingpin element of the first wheel, wherein the first drive torque is one of a braking torque or a propulsion torque;
 control the drive torque unit to apply a second drive torque to at least a second wheel of the multiple wheels, wherein the second drive torque is the other one of the braking torque or the propulsion torque, and wherein the relation between the second drive torque and the first drive torque is such that a longitudinal net force on the vehicle caused by any one of the first drive torque or the second drive torque is compensated for by the other one of the first drive torque or the second drive torque;
 control the steering unit to apply a steering force to the front wheels of the vehicle to generate a second vehicle yaw torque to at least partly compensate for a first vehicle yaw torque caused by the yaw torque for the first wheel such that the vehicle maintains the course;
 retrieve a rack force in the axle rack when the first drive torque is applied;
 acquire a steering angle of the first wheel when the first drive torque is applied;
 retrieve vehicle velocity measured when the first drive torque is applied from the vehicle inertial measurement unit or the wheel speed sensor;
 compute the friction estimate based on the applied first drive torque, the measured rack force, the vehicle velocity, and the steering angle; and
 provide a signal indicative of the friction estimate.

7. The system according to claim 6 wherein the control unit module comprises a first control unit and a second control unit,
 wherein the first control unit is configured to:
 control the drive torque unit to apply the first drive torque to the first wheel of the multiple wheels, to thereby cause the yaw torque for the first wheel about the kingpin element of the first wheel;
 control the drive torque control unit to apply the second drive torque to at least the second wheel of the multiple wheels, wherein the relation between the second drive torque and the first drive torque is such that a translational driving motion of the vehicle caused by any one of the first drive torque or the second drive torque is compensated for by the other one of the first drive torque or the second drive torque;
 control the steering unit to apply the steering force to the front wheels of the vehicle to generate the second vehicle yaw torque to at least partly compensate for the first vehicle yaw torque caused by the yaw torque for the first wheel such that the vehicle maintains the course;

wherein the second control unit is configured to:

retrieve the rack force in the axle rack when the first drive torque is applied;

retrieve vehicle velocity measured when the first drive torque is applied from the vehicle inertial measurement unit or the wheel speed sensor;

acquire a steering angle of the first wheel when the first drive torque is applied;

compute the friction estimate; and provide a signal indicative of the friction estimate.

8. The system according to claim 7 further comprising a third control unit configured to request a friction estimate from the first control unit and the second control unit.

9. The system according to claim 6 further comprising a global positioning system.

10. The system according to claim 6 wherein the force determining unit is an electrical powered assisted servo system.

11. The system according to claim 6 wherein the motion of the vehicle is along a substantially unaffected course.

12. A vehicle comprising the system according to claim 6.

13. The vehicle according to claim 12 wherein the vehicle is an autonomous vehicle.

14. A method for computing a friction estimate between a road surface and a tire of a vehicle when the vehicle is in motion along a course, the tire being arranged on a steerable wheel of the vehicle, the steerable wheel being one of multiple wheels of the vehicle, wherein the multiple wheels include two front wheels and two rear wheels, the vehicle further comprising an axle rack pivotably attached to a linkage arm connected to the steerable wheel such that a translational motion of the axle rack causes the linkage arm to rotate about a kingpin element such that the linkage arm causes a turning motion of the steerable wheel, the method comprising:

applying a first drive torque to a first wheel of the two front wheels to thereby cause a yaw torque for the first wheel about a kingpin element of the first wheel, wherein the first drive torque is a braking torque;

applying a second drive torque to a non-braking wheel of the multiple wheels, wherein the second drive torque is a propulsion torque, and wherein the relation between the second drive torque and the first drive torque is such that a longitudinal net force on the vehicle caused by any one of the first drive torque or the second drive torque is compensated for by the other one of the first drive torque or the second drive torque;

applying a braking torque to one of the rear wheels of the vehicle that is located on an opposite side of the vehicle from the first wheel with respect to a left-right orientation of the vehicle to generate a second vehicle yaw torque to at least partly compensate for a first vehicle yaw torque caused by the yaw torque for the first wheel such that the vehicle maintains the course;

measuring a rack force in the axle rack when the first drive torque is applied;

measuring a steering angle of the first wheel when the first drive torque is applied;

measuring a vehicle velocity when the first drive torque is applied;

computing the friction estimate based on the measured rack force, the braking torque applied to the first wheel, the vehicle velocity, and the steering angle.

* * * * *